(12) United States Patent
Lee et al.

(10) Patent No.: US 10,494,989 B2
(45) Date of Patent: Dec. 3, 2019

(54) APPARATUS FOR IMPROVING EFFICIENCY OF TURBOCHARGER ENGINE

(71) Applicants: Hyundai Motor Company, Seoul (KR); Kia Motors Corporation, Seoul (KR)

(72) Inventors: Won Seok Lee, Gyeonggi-do (KR); Woo Jin Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 121 days.

(21) Appl. No.: 15/825,629

(22) Filed: Nov. 29, 2017

(65) Prior Publication Data
US 2019/0093548 A1 Mar. 28, 2019

(30) Foreign Application Priority Data
Sep. 25, 2017 (KR) .................. 10-2017-0123170

(51) Int. Cl.
*F02B 37/00* (2006.01)
*F02B 37/14* (2006.01)
*F02B 37/10* (2006.01)

(52) U.S. Cl.
CPC .......... *F02B 37/005* (2013.01); *F02B 37/105* (2013.01); *F02B 37/14* (2013.01)

(58) Field of Classification Search
CPC ........ F02B 37/013; F02B 37/10; F02B 37/14; F02B 37/004; F01D 5/04; F01D 5/14; F01D 9/06; F02C 6/12
See application file for complete search history.

(56) References Cited

U.S. PATENT DOCUMENTS 5,064,423 A * 11/1991 Lorenz .................. B60T 17/02
                                                                  123/586
6,164,071 A * 12/2000 Shao ...................... F02B 33/00
                                                                  123/568.12

(Continued)

FOREIGN PATENT DOCUMENTS

DE    202015007926 U1 *  2/2017  ............ F01D 5/048
GB       2121474 B    *  7/1985  ............ F02B 21/00
KR    2014-0074592 A     6/2014

OTHER PUBLICATIONS

DE-202015007926-U1 English Translation (Year: 2015).*

*Primary Examiner* — Mark A Laurenzi
*Assistant Examiner* — Shafiq Mian
(74) *Attorney, Agent, or Firm* — Mintz Levin Cohn Ferris Glovsky and Popeo, P.C.; Peter F. Corless

(57) ABSTRACT

An apparatus for improving efficiency of a turbocharger engine including a turbocharger configured of a turbine rotated by discharge force of exhaust gas transferred from an exhaust manifold, and a compressor rotated coaxially with the turbine to compress intake air applied to an engine is provided. The turbine includes a turbine housing and a turbine wheel. The apparatus includes an auxiliary wheel that is formed at one side of the turbine wheel and an air compressor rotated by being connected to a crankshaft of the engine to generate compressed air. A valve connects between the air compressor and an air tank to transfer the compressed air to the air tank, and transfers, when charging of the air tank is completed, the compressed air to the auxiliary wheel side to increase torque of the turbine wheel.

9 Claims, 4 Drawing Sheets

(56) References Cited

U.S. PATENT DOCUMENTS

| | | | |
|---|---|---|---|
| 6,295,817 B1* | 10/2001 | Abthoff | F01N 3/30 60/612 |
| 6,324,848 B1* | 12/2001 | Gladden | F02B 37/013 123/559.1 |
| 6,422,014 B1* | 7/2002 | Gladden | F01D 17/105 123/564 |
| 6,871,642 B1* | 3/2005 | Osterwald | F02B 37/025 123/559.1 |
| 8,549,855 B2* | 10/2013 | Mayr | B60T 17/02 123/568.12 |
| 8,666,634 B2* | 3/2014 | Schaffeld | F02B 33/38 60/611 |
| 9,562,442 B2* | 2/2017 | Yoshida | F01D 9/026 60/611 |
| 2002/0053207 A1* | 5/2002 | Finger | F02B 37/005 60/605.2 |
| 2016/0090903 A1* | 3/2016 | Almkvist | F02B 37/18 60/602 |
| 2016/0097320 A1* | 4/2016 | Ohrem | F02M 26/05 60/599 |
| 2017/0074183 A1* | 3/2017 | Howard | F02D 41/0027 |

* cited by examiner

APPARATUS FOR IMPROVING EFFICIENCY OF TURBOCHARGER ENGINE

CROSS REFERENCE TO RELATED APPLICATION

The present application claims priority to Korean Patent Application No. 10-2017-0123170 filed on Sep. 25, 2017, the entire contents of which are incorporated herein for all purposes by this reference.

BACKGROUND

Technical Field

The present invention relates to an apparatus for improving efficiency of a turbocharger engine, and more particularly, to an apparatus that improves efficiency of an engine without additional fuel consumption by combining a turbocharger and an air compressor system.

Description of Related Art

Generally, to improve fuel efficiency of an engine that uses hydrocarbon fuel, technologies for an engine, an accessory device, friction, and the like in a power generation step have been improved through weight reduction, a fuel injection system, a cooling system, and general downsizing of the system. Recently, research and development of a technology of recovering waste energy that is wasted through emission gas, an engine coolant, or the like after the power generation step and regenerating the waste energy as electrical energy or mechanical energy have been actively conducted.

In particular, a considerable amount of energy is wasted even in an engine with high efficiency, and it is determined that development of technologies for combustion devices and engine peripheral devices for improving fuel efficiency have reached a limit to some extent In other words, referring to energy balance of a diesel engine for a commercial truck as an example of an engine with improved efficiency, maximum energy conversion efficiency of fuel is merely 42%, 31% is wasted in a form of mechanical friction and cooling loss, and 27% is wasted in a form of exhaust energy.

Meanwhile, in an existing commercial vehicle, an air compressor system of generating and distributing compressed air required for a pneumatic system has been applied. In particular, the air compressor is connected to a crankshaft of the engine via a gear train to generate compressed air and store the generated compressed air in a separate tank. When an air tank is fully charged, the compressed air is no longer stored in the tank and is wasted. Since the air compressor is driven by being mechanically connected to the crankshaft, the air compressor is continuously driven regardless of whether the tank is fully charged and generates compressed air, thereby causing waste energy.

The contents described as the related art have been provided merely for assisting in the understanding for the background of the present invention and should not be considered as corresponding to the related art known to those skilled in the art.

SUMMARY

An object of the present invention is to provide an apparatus for improving efficiency of a turbocharger engine, which may improve efficiency of an engine to which a turbocharger is applied by supplying compressed air which is waste energy generated in an air compressor system to a turbine.

According to an exemplary embodiment of the present invention, an apparatus for improving efficiency of a turbocharger engine may include a turbocharger having a turbine rotated by discharge force of exhaust gas transferred from an exhaust manifold, and a compressor rotated coaxially with the turbine to compress intake air applied to an engine, in which the turbine may include a turbine housing and a turbine wheel. In particular, the apparatus may include an auxiliary wheel formed at one side of the turbine wheel; an air compressor configured to be rotated by being connected to a crankshaft of the engine to generate compressed air; and a valve configured to connect between the air compressor and an air tank to transfer the compressed air to the air tank, and transfer, when charging of the air tank is completed, the compressed air to the auxiliary wheel side to increase torque of the turbine wheel.

A first inlet in which the exhaust gas flows and a second inlet in which the compressed air flows may be formed in the turbine housing. In the turbine housing, the first inlet may be formed to supply the exhaust gas in a radial direction of the turbine wheel, and the second inlet may be formed to supply the compressed air at a predetermined angle between an axial direction and a radial direction of the auxiliary wheel. The auxiliary wheel may be formed to have an end portion of a blade inclined to face a discharge direction of the compressed air of the second inlet A blade of the turbine wheel and the blade of the auxiliary wheel may be connected to each other. The valve may be a 3-way valve that connects the air compressor, the air tank, and the turbine.

The apparatus may further include: a power recovery turbine connected to the crankshaft of the engine, rotated by the discharge force of the exhaust gas discharged from the turbine to transfer driving force to the crankshaft. The valve may include an air processing unit (APU) that connects the air compressor, the air tank, and an air tank for turbo compound, and a control valve that connects the air tank for turbo compound and the turbine. The APU may be configured to supply the compressed air generated from the air compressor to the air tank, and when the charging of the air tank is complete, may be configured to supply the compressed air to the air tank for turbo compound. The apparatus may further include a controller configured to open the control valve when a pressure of the air tank for turbo compound is less than a set pressure, and close the control valve when the pressure of the air tank for turbo compound is equal to or greater than the set pressure.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an apparatus for improving efficiency of a turbocharger engine according to an embodiment of the present invention will be described with reference to the accompanying drawings.

Figure 1:
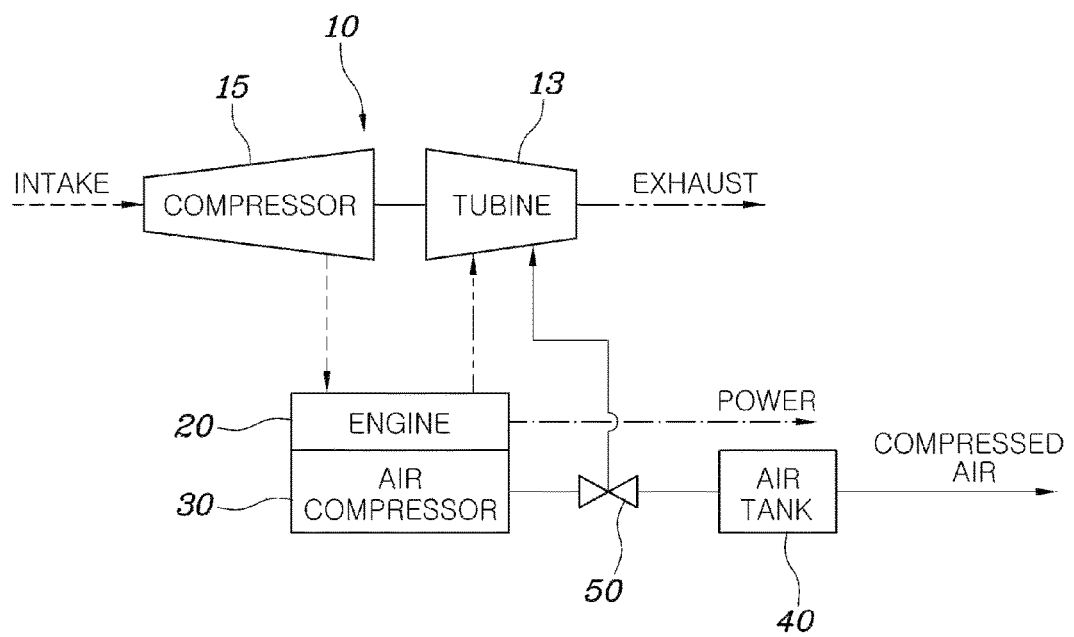
FIG. 1 is a view schematically illustrating an apparatus for improving efficiency of a turbocharger engine according to an exemplary embodiment of the present invention.
Figure 2:
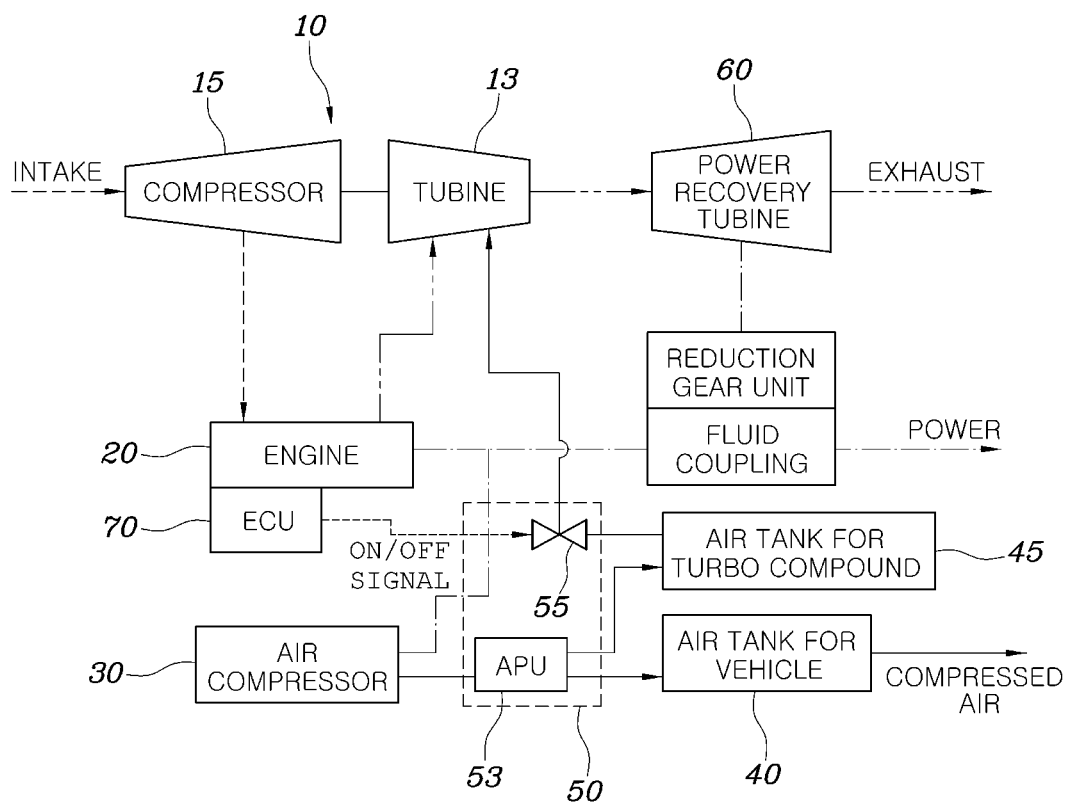
FIG. 2 is a view schematically illustrating an apparatus for improving efficiency of a turbocharger engine according to another exemplary embodiment of the present invention.
Figure 3:
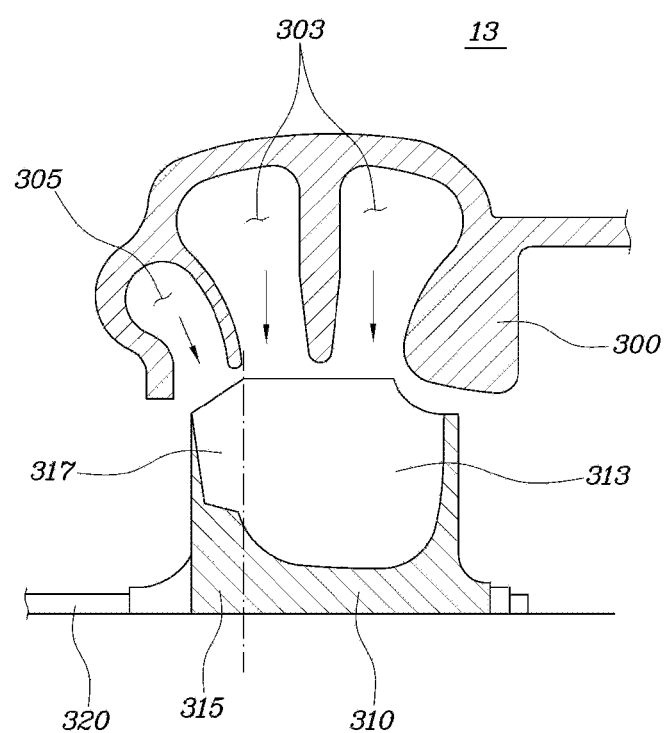
FIG. 3 is a cross-sectional view schematically illustrating a turbine of a turbocharger according to an exemplary embodiment of the present invention.
Figure 4:
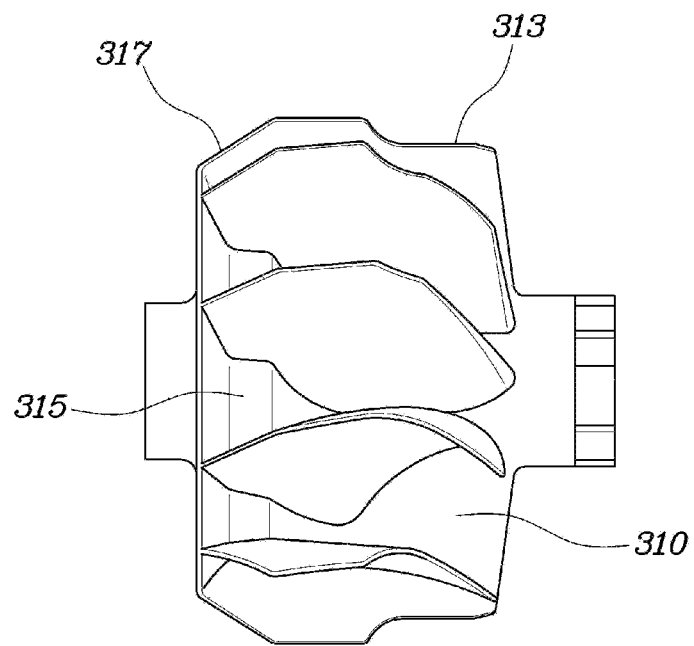
FIG. 4 is a view illustrating a turbine wheel according to an exemplary embodiment of the present invention.

FIG. 1 is a view schematically illustrating an apparatus for improving efficiency of a turbocharger engine according to an exemplary embodiment of the present invention, FIG. 2 is a view schematically illustrating an apparatus for improving efficiency of a turbocharger engine according to another exemplary embodiment of the present invention, FIG. 3 is a cross-sectional view schematically illustrating a turbine of a turbocharger according to the present invention, and FIG. 4 is a view illustrating a turbine wheel according to the present invention.

Referring to FIGS. 1, 3, and 4, in an apparatus for improving efficiency of a turbocharger engine according to an exemplary embodiment of the present invention may include a turbocharger 10 having a turbine 13 rotated by discharge force of exhaust gas transferred from an exhaust manifold, and a compressor 15 rotated coaxially with the turbine 13 to compress intake air applied to an engine 20, the turbine 13 may include a turbine housing 300 and a turbine wheel 310. The apparatus may include an auxiliary wheel 315 formed at one side of the turbine wheel 310; an air compressor 30 configured to be rotated by being connected to a crankshaft of the engine 20 to generate compressed air; and a valve 50 configured to connect between the air compressor 30 and an air tank 40 to transfer the compressed air to the air tank 40, and transfer, when charging of the air tank 40 is completed, the compressed air to the auxiliary wheel 315 side to increase torque of the turbine wheel 310.

In the turbocharger 10, the turbine 13 may be connected to the exhaust manifold of the engine 20, and the compressor 15 may be connected to an intake manifold of the engine, to rotate the turbine 13 by the discharge force of the exhaust gas discharged from a cylinder of the engine 20, and the compressor 15 that receives the torque on the same axis may be configured to compress air supplied to the engine 20, to thus increase intake efficiency of the engine 20. Meanwhile, the air compressor 30 may be provided separately to supply the compressed air to an apparatus requiring fluid pressure in a commercial vehicle, and may be operated to continuously generate the compressed air at the time of start of the engine 20, since the air compressor 30 is connected to the crankshaft that is a central shaft of the engine at all times.

The compressed air generated from the air compressor 30 may be stored and charged in the air tank 40. According to the related art, when the charging of the compressed air in the air tank 40 is complete, the remaining compressed air is discharged to the outside. However, according to the present invention, the valve 50 may be disposed between the air compressor 30 and the air tank 40, to transfer the compressed air from the air compressor 30 to the air tank 40, and when the charging of the air tank 40 is complete, the valve 50 may be configured to supply the compressed air generated from the air compressor 30 to the turbine 13 side to thus induce an increase in torque of the turbine 13.

In particular, the compressed air may be transferred to the auxiliary wheel 315 provided in the turbine 13, and the torque of the auxiliary wheel 315 may be transferred to the conventional turbine wheel 310. Therefore, waste energy generated from the air compressor 30 may be reused by the turbocharger 10, to thus increase capacity of the turbocharger 10 and output of the engine may be improved. In particularly, as illustrated in FIGS. 3 and 4, according to the present invention, a first inlet 303 in which the exhaust gas flows, and a second inlet 305 in which the compressed air flows may be formed in the turbine housing 300.

In the turbine housing 300, the first inlet 303 may be formed to supply the exhaust gas in a radial direction of the turbine wheel 310, and the second inlet 305 may be formed to supply the compressed air at a predetermined angle between an axial direction and a radial direction of the auxiliary wheel 315. In other words, the exhaust gas discharged from the engine 20 and the compressed air generated from the air compressor 30 may be supplied to an inner space of the turbine housing 300 through different inlets formed in the turbine housing 300, respectively, thus it may be possible to prevent a backflow phenomenon caused by the compressed air introduced into the exhaust manifold from occurring.

Further, the auxiliary wheel 315 according to the present invention may be formed to have an end portion of a blade inclined to face the discharge direction of the compressed air of the second inlet 305. Generally, when fluid is supplied in the radial direction of the turbine wheel 310, the turbine wheel 310 may be rotated with maximum efficiency only when an end of a blade 313 of the turbine wheel is formed to be parallel with an axial direction of a rotational shaft 320.

Meanwhile, according to the present invention, the second inlet 305 of the housing 300 is formed to supply the compressed air to the auxiliary wheel 315 in the diagonal direction, thus, a blade 317 of the auxiliary wheel that corresponds to the second inlet 305 may be formed in a direction orthogonal to the discharge direction of the compressed air of the second inlet 305, thereby maximizing rotation efficiency of the auxiliary wheel 315. Accordingly, low-speed responsiveness may be improved while downsizing and reducing weight of the auxiliary wheel 315.

Further, according to the present invention, the blade of the turbine wheel 310 and the blade of the auxiliary wheel 315 may be connected to each other. In other words, the auxiliary wheel 315 and the turbine wheel 310 are not provided separately from each other, but may be configured as one blade. In particular, the compressed air may flow to the turbine wheel blade 313 via the auxiliary wheel blade 317 to increase torque of the turbine wheel 310, to thus improve responsiveness at low-speed torque of the turbocharger engine, thereby improving start performance. Therefore, driving efficiency may be improved while minimizing a package volume of the turbine, thereby improving productivity of the vehicle.

Meanwhile, referring to FIGS. 1, 3, and 4 again, according to an exemplary embodiment, the valve 50 may be a 3-way valve that connects the air compressor 30, the air tank 40, and the turbine 13 of the turbocharger 10. Particularly, the 3-way valve may have a structure in which the compressed air is automatically supplied from the air compressor 30 to the turbine 13 side when a pressure at which the charging of the air tank 40 is completed is reached, or may also be operated by a control signal when the charging of the air tank is completed, to cause the compressed air to flow from the air compressor 30 to the turbine 13 side. Accordingly, the turbine 13 of the turbocharger 10 according to an exemplary embodiment of the present invention may be rotated by the exhaust gas discharged from the engine 20 and the compressed air discharged from the air compressor 30. As a result, force rotating the compressor 15 becomes stronger to increase the compression efficiency of the intake air, thereby improving efficiency of the engine.

Meanwhile, referring to FIGS. 2, 3, and 4, according to another exemplary embodiment of the present invention, the apparatus for improving efficiency of a turbocharger engine may further include a power recovery turbine 60 connected to the crankshaft of the engine 20, rotated by the discharge force of the exhaust gas discharged from the turbine 13 of the turbocharger 10 to transfer driving force to the crankshaft. This system is referral to as a turbo compound system. The power recovery turbine 60 may be mounted in an exhaust system of a rear end of the turbocharger 10 to recover kinetic energy of the exhaust gas to the engine 20. The power recovery turbine 60 may be mechanically connected to the crankshaft of the engine 20 via a reduction gear unit and a fluid coupling to transfer torque.

According to such configuration described above, kinetic energy of the exhaust gas and the compressed air wasted after driving the turbine 13 may be recovered to the engine 20, thus it may be possible to improve efficiency of the engine. According to the present exemplary embodiment, the valve 50 may include an air processing unit (APU) 53 that connects the air compressor 30, the air tank 40, and an air tank 45 for turbo compound, and a control valve 55 that connects the air tank 45 for turbo compound and the turbine 13 of the turbocharger.

In particular, the APU 53 may be configured to supply the compressed air generated from the air compressor 30 to the air tank 40, and when the charging of the air tank 40 is completed, supply the compressed air to the air tank 45 for turbo compound. In other words, when the power recovery turbine 60 is applied at the rear end of the turbocharger 10, the compressed air generated from the air compressor 30 may be charged in the air tank 40 and the air tank 45 for turbo compound using the APU 53, and thus, even when the compressed air is not supplied from the air compressor 30, the turbine 13 and the power recovery turbine 60 may be driven using spare air of the air tank 45 for turbo compound.

Further, according to the present exemplary embodiment, the apparatus for improving efficiency of a turbocharger may further include a controller 70 configured to open the control valve 55 when a pressure of the air tank 45 for turbo compound is less than a set pressure, and close the control valve 55 when the pressure of the air tank 45 for turbo compound is equal to or greater than the set pressure. For the control valve 55, an on/off valve may be used provided to transmit pressure information of the air tank 45 for turbo compound to the controller 70, and in response to receiving the pressure information the controller 70 may be configured to turn the control valve 55 on or off to supply the compressed air to the turbine 13 and the power recovery turbine 60. Accordingly, by applying the turbo compound system at the rear end of the turbocharger 10, efficiency of the engine and the turbocharger may be improved using the exhaust gas and the compressed air.

According to the apparatus for improving efficiency of a turbocharger engine having the above-described structure, compressed air remaining after completing the charging of the air tank may be supplied to the turbine of the turbocharger by the operation of the air compressor to increase capacity of the turbocharger, thereby making it possible to improve efficiency of the engine. Further, since additional torque may be applied to the turbocharger, responsibility at the time of low-speed torque of the turbocharger engine may be improved. As a result, it may be possible to improve vehicle start performance. Further, the compressed air may be supplied from the air compressor to the turbine wheel in a diagonal direction, thus the turbine wheel may be downsized, thereby reducing a weight and a volume of the turbine.

Although the present invention has been shown and described with respect to exemplary embodiments, it will be obvious to those skilled in the art that the present invention may be variously modified and altered without departing from the spirit and scope of the present invention as defined by the following claims.

What is claimed is:

1. An apparatus for improving efficiency of a turbocharger engine including a turbocharger having a turbine rotated by discharge force of exhaust gas transferred from the engine, and a compressor rotated coaxially with the turbine to compress intake air applied to an engine, wherein the turbine includes a turbine housing and a turbine wheel, and the apparatus comprises:
   an auxiliary wheel formed at one side of the turbine wheel;
   an air compressor configured to be rotated by being connected to the engine to generate compressed air;
   a valve configured to connect between the air compressor and an air tank to transfer the compressed air to the air tank, and transfer, when charging of the air tank is completed, the compressed air to the auxiliary wheel side to increase torque of the turbine wheel; and
   a power recovery turbine configured to be connected to the engine, rotated by the discharge force of the exhaust gas discharged from the turbine to transfer driving force to the engine,
   wherein the valve includes an air processing unit (APU) that connects the air compressor, the air tank, and an air tank for turbo compound, and a control valve that connects the air tank for turbo compound and the turbine.

2. The apparatus of claim 1, wherein a first inlet in which the exhaust gas flows and a second inlet in which the compressed air flows are formed in the turbine housing.

3. The apparatus of claim 2, wherein in the turbine housing, the first inlet is formed to supply the exhaust gas in a radial direction of the turbine wheel, and the second inlet is formed to supply the compressed air at a predetermined angle between an axial direction and a radial direction of the auxiliary wheel.

4. The apparatus of claim 3, wherein the auxiliary wheel is formed to have an end portion of a blade inclined to face a discharge direction of the compressed air of the second inlet.

5. The apparatus of claim 4, wherein a blade of the turbine wheel and the blade of the auxiliary wheel are connected to each other.

6. The apparatus of claim 1, wherein the valve is a 3-way valve that connects the air compressor, the air tank, and the turbine.

7. The apparatus of claim 1, wherein the APU is configured to supply the compressed air generated from the air compressor to the air tank, and when the charging of the air tank is completed, supply the compressed air to the air tank for turbo compound.

8. The apparatus of claim 1, further comprising:
a controller configured to open the control valve when a pressure of the air tank for turbo compound is less than a set pressure, and close the control valve when the pressure of the air tank for turbo compound is equal to or greater than the set pressure.

9. A vehicle having the apparatus for improving efficiency of a turbocharger engine according to claim 1.

* * * * *